United States Patent
Lipmyer

(10) Patent No.: US 7,086,273 B2
(45) Date of Patent: Aug. 8, 2006

(54) FLEXIBLE PRINTED CIRCUIT CABLING SYSTEM FOR CRASH TEST DUMMY

(75) Inventor: Robert Gerald Lipmyer, Ann Arbor, MI (US)

(73) Assignee: First Technology Safety Systems, Inc., Plymouth, MI (US)

( * ) Notice: Subject to any disclaimer, the term of this patent is extended or adjusted under 35 U.S.C. 154(b) by 10 days.

(21) Appl. No.: 10/729,052

(22) Filed: Dec. 5, 2003

(65) Prior Publication Data

US 2005/0126258 A1    Jun. 16, 2005

(51) Int. Cl.
*G01M 7/00*    (2006.01)
(52) U.S. Cl. .................................................. 73/12.09
(58) Field of Classification Search ............... 73/12.09, 73/12.04, 862.381, 862.451, 862.471, 862.621, 73/862.625, 862.636
See application file for complete search history.

(56) References Cited

U.S. PATENT DOCUMENTS

| | | | |
|---|---|---|---|
| 3,841,163 A * | 10/1974 | Daniel ........................ | 73/866.4 |
| 4,261,113 A | 4/1981 | Alderson | |
| 4,349,339 A | 9/1982 | Daniel | |
| 4,409,835 A | 10/1983 | Daniel et al. | |
| 4,488,433 A | 12/1984 | Denton et al. | |
| 4,701,132 A | 10/1987 | Groesch et al. | |
| 4,845,315 A * | 7/1989 | Stopper ....................... | 361/827 |
| 4,873,867 A | 10/1989 | McPherson et al. | |
| 5,018,977 A * | 5/1991 | Wiley et al. ................. | 434/274 |
| 5,526,707 A | 6/1996 | Smrcka | |
| 5,528,943 A | 6/1996 | Smrcka et al. | |
| 5,589,651 A | 12/1996 | Viano et al. | |
| 5,655,922 A | 8/1997 | Dux et al. | |
| 5,741,989 A | 4/1998 | Viano et al. | |
| 6,206,703 B1 | 3/2001 | O'Bannon | |
| 6,220,089 B1 | 4/2001 | Gu et al. | |
| 6,439,070 B1 | 8/2002 | Beebe et al. | |

* cited by examiner

*Primary Examiner*—Max Noori
(74) *Attorney, Agent, or Firm*—Bliss McGlynn, P.C.

(57) ABSTRACT

A flexible printed circuit cabling system for a crash test dummy includes at least one centralized data-receiving unit. The flexible printed circuit cabling system also includes a plurality of sensors arranged remotely from the at least one centralized data receiving unit to generate electrical signals of data pertaining to a vehicular collision. The flexible printed circuit cabling system further includes a plurality of flexible printed circuit cables electrically interconnecting the sensors and the at least one centralized data receiving unit to transmit the electrical signals from the sensors to the at least one centralized data receiving unit.

16 Claims, 4 Drawing Sheets

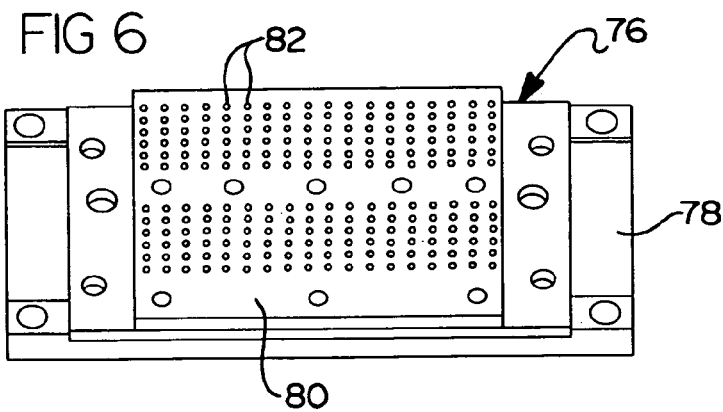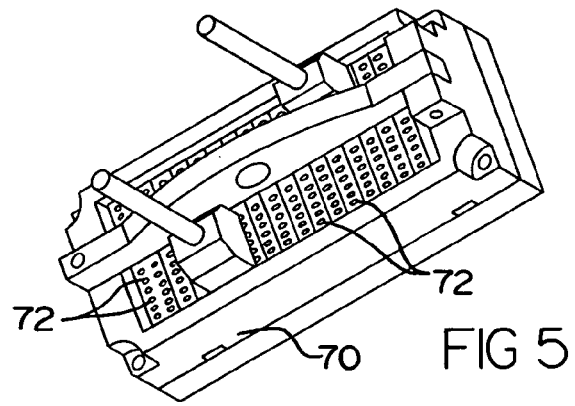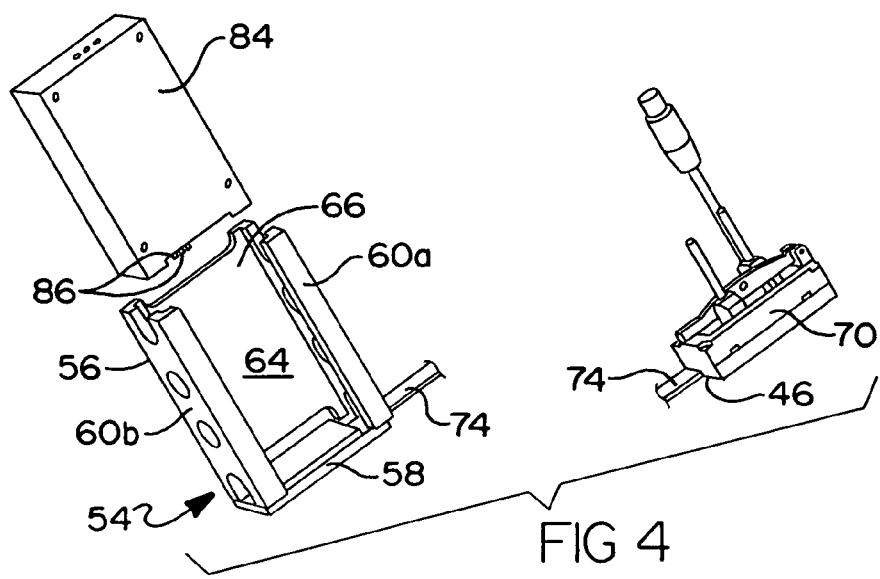

FLEXIBLE PRINTED CIRCUIT CABLING SYSTEM FOR CRASH TEST DUMMY

BACKGROUND OF THE INVENTION

1. Field of the Invention

The present invention relates generally to crash test dummies and, more particularly, to a flexible printed circuit cabling system for a crash test dummy.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle.

Collision testing often involves the use of anthropomorphic mannequins, better known as "crash test dummies." During collision testing, an operator places a crash test dummy inside a vehicle, and the vehicle undergoes a simulated collision. The collision exposes the crash test dummy to high inertial loading, and sensors inside the crash test dummy, such as accelerometers, pressure gauges, and the like, generate electrical signals of data corresponding to the loading. Conventional cables transmit these electrical signals of data to a data acquisition system (DAS) for subsequent processing. This data reveals information about the effects of the collision on the crash test dummy and can be correlated to the effects a similar collision would have on a human occupant.

In order to obtain more accurate collision data, test engineers attempt to maximize what is known as the "biofidelity" of the crash test dummy. Biofidelity is a measure of how the crash test dummy reacts in a vehicle collision test. A crash test dummy reacting as an actual human would during a collision is said to have a high biofidelity. Accordingly, a crash test dummy having a high biofidelity will provide more accurate information from a collision test relative to the effect of the collision on a human being. Thus, vehicle collision test engineers design crash test dummies with a total weight, center of gravity, and flexibility similar to that of a human body so as to increase the biofidelity of the crash test dummy.

However, the cables that connect the sensors to the DAS often degrade the biofidelity of the crash test dummies. More specifically, the configurations used are usually heavy, bulky umbilical cable systems extending out of the crash test dummy to the DAS. Since there can be many sensors inside the crash test dummy, there can be a large number of heavy, bulky cables extending out of the crash test dummy, thereby adversely affecting the dummy's center of gravity and weight distribution. Moreover, maneuvering the crash test dummy with this large number of cables during test preparation can be challenging.

To ameliorate this problem, test engineers typically tape, hang, or tie off the umbilical cables. However, this type of preparation is labor intensive. Moreover, this preparation does not satisfactorily improve the biofidelity in all cases.

Test engineers have also attempted positioning the cable systems and DAS inside the crash test dummy so as to improve biofidelity. However, many test configurations do not fit inside the limited space inside the crash test dummy. Also, removing structures from inside the crash test dummy to make room for the cables and DAS may actually violate governmental crash test regulations. Thus, internalizing the cabling system and DAS has found limited application. Therefore, there is a need in the art to provide a lightweight, compact cabling system for use in a crash test dummy so that biofidelity of the crash test dummy is improved.

SUMMARY OF THE INVENTION

Accordingly, the present invention is a flexible printed circuit cabling system for a crash test dummy. The flexible printed circuit cabling system includes at least one centralized data-receiving unit. The flexible printed circuit cabling system also includes a plurality of sensors arranged remotely from the at least one centralized data receiving unit to generate electrical signals of data pertaining to a vehicular collision. The flexible printed circuit cabling system further includes a plurality of flexible printed circuit cables electrically interconnecting the sensors and the at least one centralized data receiving unit to transmit the electrical signals from the sensors to the at least one centralized data receiving unit.

In addition, the present invention is a crash test dummy including a body and a plurality of remote sensors operatively attached to the body and capable of generating electrical signals of data relating to a vehicular collision. The crash test dummy also includes at least one centralized data-receiving unit positioned away from the remote sensors and capable of receiving the electrical signals of data relating to a vehicular collision. The crash test dummy further includes a plurality of flexible printed circuit cables electrically interconnecting the remote sensors and the at least one centralized data receiving unit to transmit the electrical signals from the sensors to the at least one centralized data receiving unit.

One advantage of the present invention is that a flexible printed circuit cabling system is provided for a crash test dummy. Another advantage of the present invention is that the flexible printed circuit cabling system has flexible printed circuit cables that are much lighter than conventional cables, and are less likely to degrade the biofidelity of the crash test dummy. Yet another advantage of the present invention is that the flexible printed circuit cabling system has flexible printed circuit cables that are more compact such that they can be largely positioned within an internal cavity of the crash test dummy. Still another advantage of the present invention is that the flexible printed circuit cabling system improves biofidelity, allows more sensors to be used in the crash test dummy, reduces time spent in preparing the test, and makes maneuvering the crash test dummy more convenient.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 4 is a perspective view of a data acquisition system, a docking station, a flexible printed circuit cable, and a connection block of the flexible printed circuit cabling system of FIG. 1.

FIG. 5 is a perspective view of a connection block of the flexible printed circuit cabling system of FIG.

FIG. 6 is a perspective view of an interposer of the flexible printed circuit cabling system of FIG. 1.

DESCRIPTION OF THE PREFERRED EMBODIMENT(S)

Figure 1:
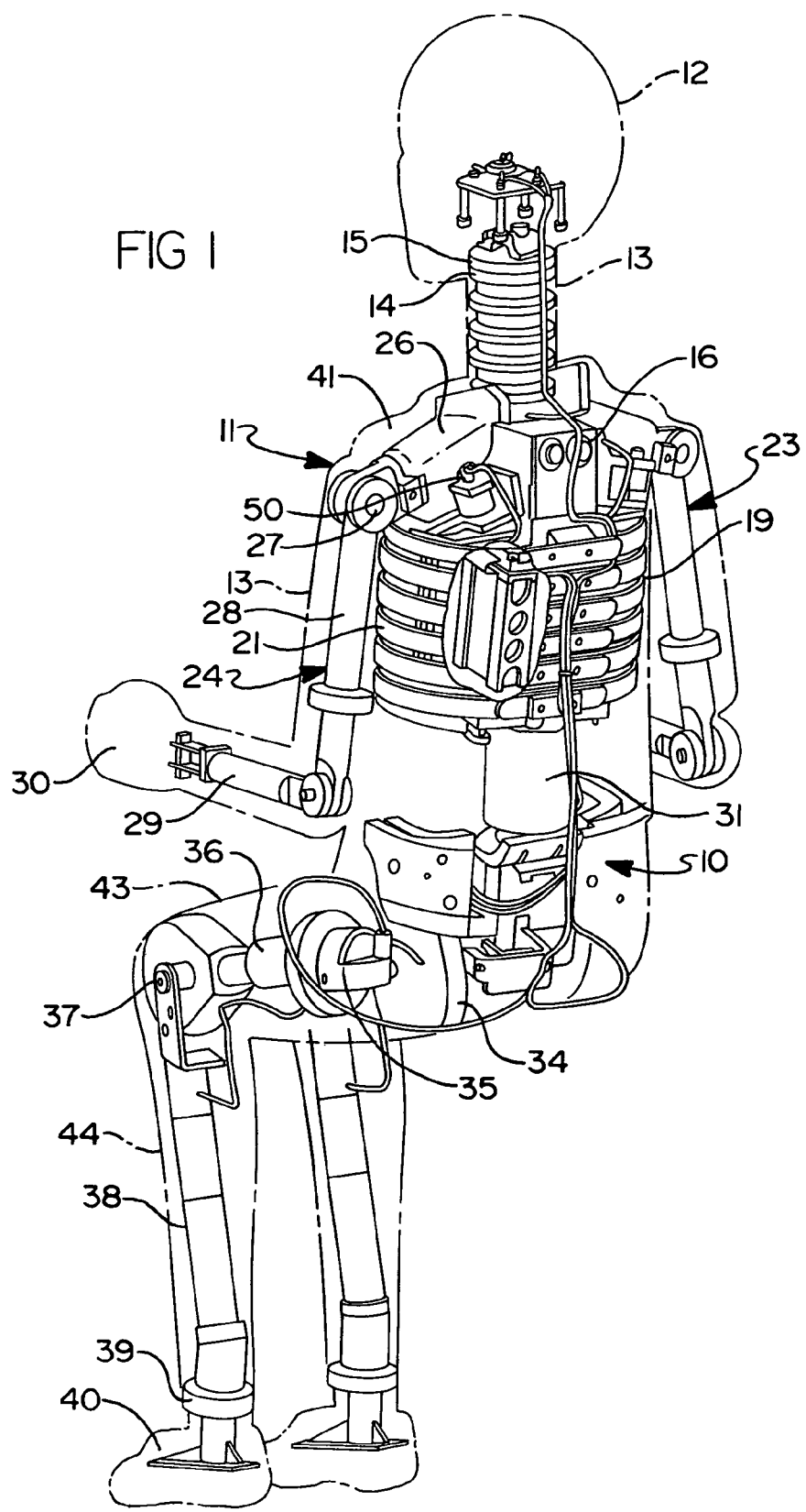
FIG. 1 is a perspective view of a flexible printed circuit cabling system, according to the present invention, illustrated in operational relationship with a crash test dummy.
Figure 2:
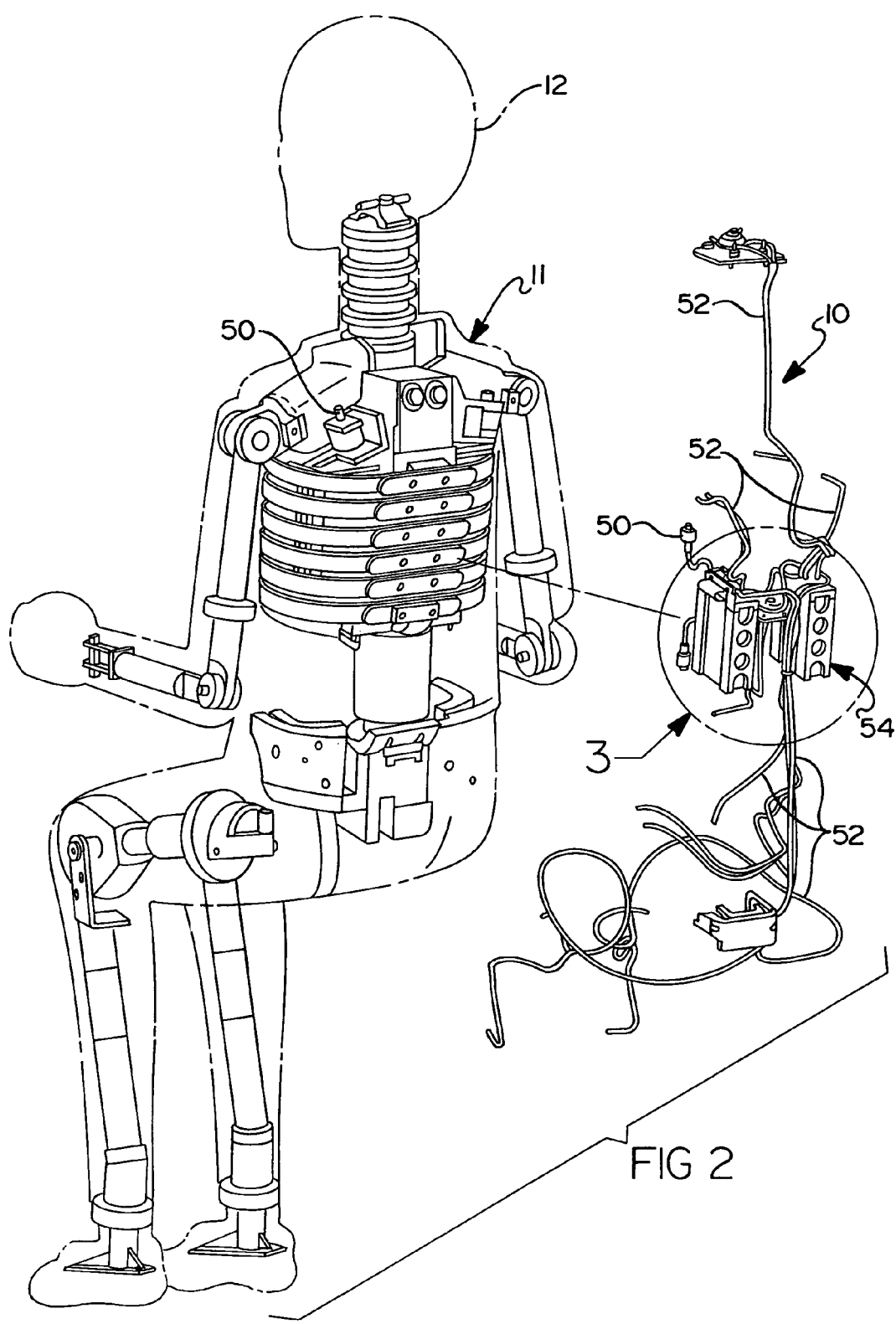
FIG. 2 is an exploded view of the flexible printed circuit cabling system and crash test dummy of FIG. 1.

Referring to the drawings and in particular FIGS. 1 and 2, one embodiment of a flexible printed circuit cabling system 10, according to the present invention, is shown in operational relationship with a crash test dummy, generally indicated at 11. The crash test dummy 11 is of a Hybrid III fifth percentile female type and is illustrated in a sitting position. This crash test dummy 11 is used primarily to test the performance of automotive interiors and restraint systems for very small adult front and rear seat occupants. The size and weight of the crash test dummy 11 are based on anthropometric studies by the Human Biomechanics and Simulation Standards Committee Task Force of the Society of Automotive Engineers and represent the lower extreme of the USA adult population. It should be appreciated that ranges of motions, centers of gravity, and segment masses simulate those of human subjects defined by the anthropometric data.

The crash test dummy 11 has a head assembly 12, which is shown in cross-section and includes a one-piece cast aluminum skull and one-piece skull cap both covered by a vinyl skin. The skull cap is removable for access to head instrumentation contained inside the head assembly 12. The head assembly 12 is mounted at the top end of a neck assembly 13 by a nodding block 14 and a nodding joint 15. A lower end of the neck assembly 13 extends into a torso area of the crash test dummy 11 and is connected to an upper end of a thoracic spine 16 by an upper neck bracket (not shown) connected to a lower neck bracket (not shown). The torso area of the crash test dummy 11 includes a rib assembly 19 having an upper end connected to the upper neck bracket and a lower end connected to a sternum assembly (not shown). A rib set 21 has a plurality of ribs connected between the sternum assembly and the thoracic spine 16. The lower end of the spine 16 is connected to a spine mounting weldment (not shown) by an adapter assembly (not shown).

The crash test dummy 11 also has a pair of arm assemblies including a right arm assembly 23 and a left arm assembly 24, which are attached to the crash test dummy 11. The left arm assembly 24 includes a clavicle link (not shown), which connects a clavicle 26 to the top of the thoracic spine 16. The clavicle 26 is connected to a shoulder yoke 27, which in turn is connected to an upper end of an upper arm assembly 28. A lower end of the upper arm assembly 28 is connected to an upper end of a lower arm assembly 29. A lower end of the lower arm assembly 29 is connected to a hand assembly 30. It should be appreciated that the right arm assembly 23 is constructed in a similar manner.

As illustrated in the FIG. 1, a lower end of the lumbar spine 31 is connected to a lumbar-thoracic adapter (not shown), which is connected to a lumbar to pelvic adapter 33. A pelvis assembly 34 is connected to the adapter 33. A femur assembly 35 for a left leg has one end connected to the pelvis assembly 34. An opposite end of the femur assembly 35 is connected to a thigh bone 36 having an opposite end connected to a sliding knee assembly 37. One end of a tibia 38 is connected to the knee assembly 37 and an opposite end is connected to an ankle assembly 39. The ankle assembly 39 is connected to a foot assembly 40. It should be appreciated that, although only the left leg is described, the right leg is similar in construction.

The various components of the crash test dummy 11 are covered in a vinyl skin such as the chest flesh and skin assembly 41, which extends from the lower end of the neck assembly 13 to a central portion of the lumbar spine 31. A lower end of the chest flesh and skin assembly 41 partially covers an upper portion of an abdominal insert (not shown) positioned in the lower torso. A lower portion of the abdominal insert is covered by an upper portion of the pelvis assembly 34. A thigh flesh and skin 43 covers the thigh bone 36 and a lower leg flesh/skin 44 covers the portion of the leg between the knee and the foot. A lifting ring (not shown) may be attached to the head assembly 12 for lifting the crash test dummy 11 into and out of test fixtures and vehicles. As illustrated, the flexible printed circuit cabling system 10 is operatively attached to a crash test dummy 12. It should be appreciated that the flexible printed circuit cabling system 10 can be used with a wide variety of crash test dummies 12 including those that represent only a partial human form. It should also be appreciated that, except for the flexible printed circuit cabling system 10 to be described, the crash test dummy 12 is similar to that disclosed in U.S. Pat. No. 5,741,989, the disclosure of which is hereby incorporated by reference.

The flexible printed circuit cabling system 10 includes at least one, preferably a plurality of sensors 50 operatively attached to the shoulder, elbow, and wrist of the arm assembly 24, H-point of the pelvis assembly 34, knee assembly 37, and ankle assembly 39. The sensors 50 may be of a type such as load cells, pressure sensors, accelerometers, and other sensors commonly used in vehicle collision testing. The sensors 50 generate an electrical signal as a result of the application of some physical force, acceleration, pressure, or other input. It should be appreciated that the sensors 50 are capable of generating a variety of data relating to a vehicle collision.

Referring to FIGS. 1 through 4, the flexible printed circuit cabling system 10 also includes at least one, preferably a plurality of flexible printed circuit cables 52. Each flexible printed circuit cable 52 is an array of conductors bonded to a thin dielectric film, and can undergo repeated flexing without failure. In one embodiment, the individual flexible printed circuit cables 52 measure approximately 0.15 inches wide, between 0.01 and 0.05 inches thick, and are between 1 to 4 feet in length.

The flexible printed circuit cables 52 are electrically attached to individual sensors 50 in a suitable manner, allowing the cables 52 to receive and transmit electrical signals generated by the respective sensors 50. In one embodiment, the entire length of each flexible printed circuit cable 52 is positioned within an internal cavity of the crash test dummy 11. Some of the cables 52 extend within the internal cavity between the torso and the head assembly 12. Since the sensors 50 vary in the amount of signals they individually generate, the flexible printed circuit cables 52 similarly vary in the amount of separate signals they can transmit. For instance, in one embodiment, at least one of the flexible printed circuit cables 52 is capable of transmitting up to three signals of electrical data generated by one sensor 50. In one embodiment, the flexible printed circuit cables 52 have at least one, preferably a plurality of pins 53 at one end for connection to a centralized data-receiving unit 54 to be described. In another embodiment, the flexible printed circuit cables 52 have one end connected to an electrical connector (not shown) having at least one, preferably a plurality of pins 53 at one end for connection to a centralized data-receiving unit 54 to be described. It should be appreciated that the flexible printed circuit cables 52 are much lighter and more compact than conventional cabling. It should also be appreciated that the flexible printed circuit cabling system 10 increases the biofidelity of the crash test dummy 11.

As illustrated in FIGS. 1 through 4, the flexible printed circuit cabling system 10 further includes a centralized data-receiving unit, generally indicated at 54, disposed within the torso of the crash test dummy 11. All of the flexible printed circuit cables 52 are electrically connected to the centralized data-receiving unit 54 in a manner to be described. As such, the sensors 50 are positioned remotely from the centralized data receiving unit 54, and the flexible printed circuit cables 52 extend in an umbilical manner between the sensors 50 and the centralized data receiving unit 54, allowing electrical signals from the sensors 50 to be transmitted to the centralized data receiving unit 54. It should be appreciated that the centralized data-receiving unit 54 collects and stores data from the sensors 50 for subsequent processing.

Figure 3:
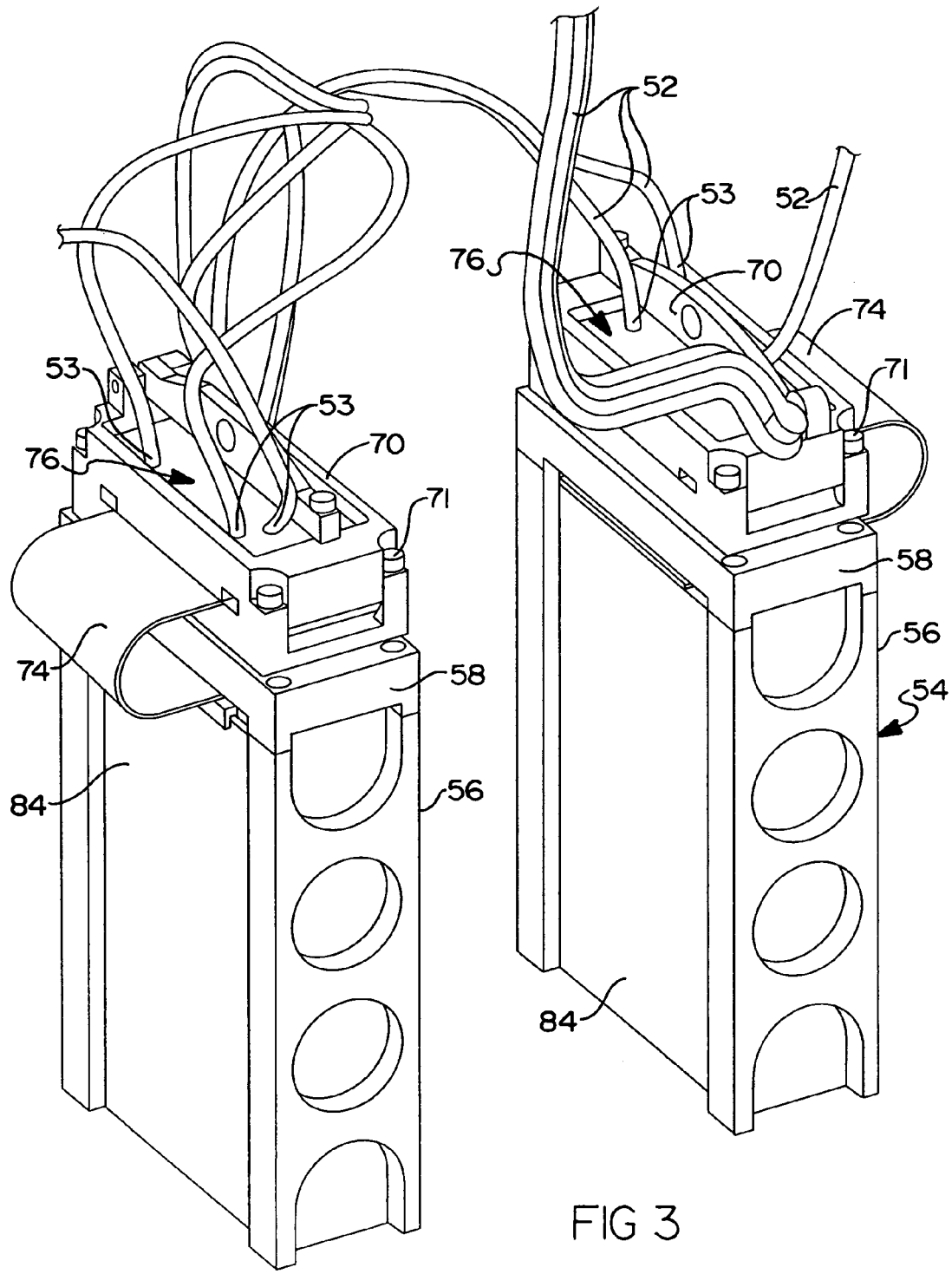
FIG. 3 is a perspective view of a portion of the flexible printed circuit cabling system in circle 3 of FIG. 2.

Referring to FIGS. 3 through 5, the centralized data-receiving unit 54 includes at least one docking station 56. The docking station 56 is generally rectangular and hollow with a base 58 and two side walls 60a, 60b and a back wall 64 that extend perpendicularly outward from the base 58. The side walls 60a, 60b and the back wall 64 define an opening 66 in the docking station 56. It should be appreciated that the docking station 56 allows the mounting other components of the centralized data-receiving unit 54.

The centralized data-receiving unit 54 further includes at least one connection block 70. The connection block 70 is generally rectangular in shape. The connection block 70 is connected to the docking station 60 by suitable means such as fasteners 71. The connection block 70 also includes at least one, preferably a plurality of pin receptacles 72. The flexible printed circuit cables 52 are electrically connect to the connection block 70 via the pins 53 and pin receptacles 72. The connection block 40 includes a large number of pin receptacles 72, enabling a plurality of flexible printed circuit cables 52 to connect thereto. For example, in the embodiment illustrated, there are two hundred sixteen (216) pin receptacles 72, thereby allowing many flexible printed circuit cables 52 to electrically attach thereto. It should be appreciated that, due to this large capacity, the connection block 70 allows a large number of sensors 50 to be used in the flexible printed circuit cabling system 10. It should also be appreciated that, in another embodiment, the pin receptacles 72 of the connection block 70 are capable of making electrical connection with both the flexible printed circuit cable 52 and a conventional cable (not shown).

The centralized data-receiving unit 54 further includes at least one central flexible printed circuit cable 74. The central flexible printed circuit cable 74 is similar to the printed flexible printed circuit cables 52 attached to the sensors 50. The central flexible printed circuit cable 74 is an array of conductors bonded to a thin dielectric film and can undergo repeated flexing without failure. The central flexible printed circuit cable 74 is electrically connected to the connection block 70 and can further transmit the electrical signals originally generated by the sensors 50.

Additionally, the centralized data-receiving unit 54 includes at least one interposer, generally indicated at 76. As illustrated in FIG. 6, the interposer 76 is a generally planar and rectangular shaped component having a planar base 78 and a connection board 80 mounted to the base 78. The connection board 80 includes at least one, preferably a plurality of pin receptors 82. In one embodiment, the connection board 80 includes approximately two hundred sixteen (216) pin receptors 82. The interposer 76 is connected to the docking station 56 by suitable means such as a fastener (not shown). As illustrated, the interposer 76 is attached to the base 58 of the docking station 56 on the side opposite that of the connection block 70. The central flexible printed circuit cable 74 extends from the connection block 76, around the base 58 of the docking station 56, and is electrically connected to the interposer 76. It should be appreciated that signals in the central flexible printed circuit cable 74 are transmitted to the interposer 76 via the pin receptors 82.

Referring to FIGS. 1 through 4, the centralized data-receiving unit 56 includes at least one data acquisition system (DAS) 84. In one embodiment, the DAS 84 used is a TDAS G5 unit manufactured by Diversified Tech Systems in California. The DAS 84 is shaped like a rectangular block that slides lengthwise into the docking station 56 through its opening 66 and toward the interposer 76 to be surrounded by the back wall 64, side walls 60a, 60b, and base 58.

The DAS 84 also has a plurality of pins 86 extending outwardly from its side closest to the interposer 76. The pins 86 of the DAS 84 are arranged in a pattern similar to the arrangement of pin receptors 82 of the interposer 76 such that pins 86 of the DAS 84 slide into the pin receptors 82 of the interposer 76. This creates an electrical connection so the DAS 84 can receive the electrical signals of data from the sensors 50. It should be appreciated that, once received, the DAS 84 stores the data for subsequent data processing.

The DAS 84 also includes a port (not shown) that allows data stored in the DAS 84 to be uploaded to a computer (not shown) for processing. For example, in one embodiment, the port is an Ethernet port, and the data is uploaded from the DAS 84 through this Ethernet port to the computer for processing. In another embodiment, the DAS 84 can wirelessly communicate stored data to the computer for further processing.

The centralized data-receiving unit 54 of the flexible printed circuit cabling system 10 may include one or more DAS 84. For example, in the embodiment illustrated in FIGS. 1 through 3, the centralized data acquisition unit 54 includes two DAS 84, and each DAS 84 has an individual associated interposer 76 and connection block 70. As such, a portion of the flexible printed circuit cables 52 are connected to one of the connection blocks 70, and the remaining cables 52 are connected to the other connection block 70. Increasing the number of DAS 84 in this manner consequently increases the data capacity of the flexible printed circuit cabling system 10. It should be appreciated that the flexible printed circuit cabling system 10 is largely contained within the internal cavity of the crash test dummy 11. In the embodiment shown, all of the components of the flexible printed circuit cabling system 10 are contained within the internal cavity of the crash test dummy 11. In other embodiments not shown, some of the components, such as the DAS 84 are positioned outside the crash test dummy 11. It should be appreciated that positioning some or all of the components inside the crash test dummy 11 improves biofidelity and convenience. Thus, by using flexible printed circuit cables 30 to connect the centralized data-receiving unit 80 to remote sensors 20, the cabling system 10 presents several advantages over conventional cabling systems. For instance, the flexible printed circuit cables 30 are much lighter than cables currently used. As such, the flexible printed circuit cabling system 10 is less likely to adversely affect the dummy's total weight, center of gravity, and the like. Consequently, a crash test dummy 12 configured with the flexible printed circuit cabling system 10 of the present invention is likely to have a higher biofidelity than a crash test dummy 12 with a plurality of heavy conventional cables.

To operate the flexible printed circuit cabling system 10, an operator (not shown) operatively connects the flexible printed circuit cabling system 10 to the crash test dummy 11, positions the crash test dummy 11 within a vehicle, and then simulates a vehicular collision with the test vehicle. During the collision, the sensors 50 inside the crash test dummy 12 each generate electrical signals of data corresponding to the collision's effect on the crash test dummy 11. This data is transmitted from the sensors 50, through the individual flexible printed circuit cables 52, and into the connection block 70 of the centralized data-receiving unit 56. The data is then transmitted through the central flexible printed circuit cable 74, through the interposer 76, and finally stored in the DAS 84. This stored data is then uploaded to the computer (not shown) for processing, and the processed data reveals the effects of the test collision on the crash test dummy 11. It should be appreciated that these effects can help predict the effects of a similar collision on an actual human being.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A flexible printed circuit cabling system for a crash test dummy comprising:
   at least one centralized data-receiving unit;
   a plurality of sensors arranged remotely from said at least one centralized data receiving unit to generate electrical signals of data pertaining to a vehicular collision; and
   a plurality of flexible printed circuit cables electrically interconnecting said sensors and said at least one centralized data receiving unit to transmit the electrical signals from said sensors to said at least one centralized data receiving unit.

2. A flexible printed circuit cabling system as set forth in claim 1 wherein said sensors and said flexible printed circuit cables are disposed within an internal cavity of the crash test dummy.

3. A flexible printed circuit cabling system as set forth in claim 2 wherein said at least one centralized data receiving unit is disposed within the internal cavity of the crash test dummy.

4. A flexible printed circuit cabling system as set forth in claim 2 wherein said at least one centralized data receiving unit comprises a connection block and at least one of said flexible printed circuit cables being electrically connected to said connection block.

5. A flexible printed circuit cabling system comprising:
   at least one centralized data-receiving unit;
   a plurality of sensors arranged remotely from said at least one centralized data receiving unit to generate electrical signals of data pertaining to a vehicular collision;
   a plurality of flexible printed circuit cables electrically interconnecting said sensors and said at least one centralized data receiving unit to transmit the electrical signals from said sensors to said at least one centralized data receiving unit; and
   wherein said at least one centralized data receiving unit further comprises an interposer electrically connected to said connection block.

6. A flexible printed circuit cabling system as set forth in claim 5 wherein said at least one centralized data receiving unit further comprises a data acquisition system electrically connected to said interposer and storing the data pertaining to the vehicular collision.

7. A flexible printed circuit cabling system as set forth in claim 6 including a central flexible printed circuit cable electrically interconnecting said connection block and said interposer.

8. A crash test dummy comprising:
   a body;
   a plurality of remote sensors operatively attached to said body and capable of generating electrical signals of data relating to a vehicular collision;
   at least one centralized data receiving unit positioned away from said remote sensors and capable of receiving the electrical signals of data relating to a vehicular collision; and
   a plurality of flexible printed circuit cables electrically interconnecting said remote sensors and said at least one centralized data receiving unit to transmit the electrical signals from said sensors to said at least one centralized data receiving unit.

9. A crash test dummy as set forth in claim 8 wherein said body has an internal cavity therein and said remote sensors and said flexible printed circuit cables are disposed within said internal cavity.

10. A crash test dummy as set forth in claim 8 wherein said at least one centralized data receiving unit is disposed within said internal cavity.

11. A crash test dummy as set forth in claim 8 wherein said at least one centralized data receiving unit comprises a connection block and at least one of said flexible printed circuit cables being electrically connected to said connection block.

12. A crash test dummy comprising:
   a body;
   a plurality of remote sensors operatively attached to said body and capable of generating electrical signals of data relating to a vehicular collision;
   at least one centralized data receiving unit positioned away from said remote sensors and capable of receiving the electrical signals of data relating to a vehicular collision;
   a plurality of flexible printed circuit cables electrically interconnecting said remote sensors and said at least one centralized data receiving unit to transmit the electrical signals from said sensors to said at least one centralized data receiving unit; and
   wherein said at least one centralized data receiving unit further comprises an interposer electrically connected to said connection block.

13. A crash test dummy as set forth in claim 12 wherein said at least one centralized data receiving unit further comprises a data acquisition system electrically connected to said interposer and storing the data pertaining to the vehicular collision.

14. A crash test dummy as set forth in claim 13 including a central flexible printed circuit cable electrically interconnecting said connection block and said interposer.

15. A crash test dummy as set forth in claim 13 wherein one of said interposer and said data acquisition system includes a plurality of pin receptors and the other of said interposer and said data acquisition system includes a plurality of pins that slide into said pin receptors to thereby establish an electrical connection between said interposer and said data acquisition system.

16. A flexible printed circuit cabling system as set forth in claim 6 wherein one of said interposer and said data acquisition system includes a plurality of pin receptors and the other of said interposer and said data acquisition system includes a plurality of pins that slide into said pin receptors to thereby establish an electrical connection between said interposer and said data acquisition system.

* * * * *

UNITED STATES PATENT AND TRADEMARK OFFICE
CERTIFICATE OF CORRECTION

| | | |
|---|---|---|
| PATENT NO. | : 7,086,273 B2 | Page 1 of 1 |
| APPLICATION NO. | : 10/729052 | |
| DATED | : August 8, 2006 | |
| INVENTOR(S) | : Robert Gerald Lipmyer | |

It is certified that error appears in the above-identified patent and that said Letters Patent is hereby corrected as shown below:

Column 2, line 64, "FIG.", should read -- FIG. 1 --.

Signed and Sealed this

Seventeenth Day of October, 2006

JON W. DUDAS
*Director of the United States Patent and Trademark Office*